US011356735B2

(12) United States Patent
Thomas et al.

(10) Patent No.: US 11,356,735 B2
(45) Date of Patent: Jun. 7, 2022

(54) DEVICES, SYSTEMS AND PROCESSES FOR MULTI-DEVICE ACCESS, CONTROL AND PRESENTATION OF STREAMING CONTENT

(71) Applicant: Sling Media Pvt. Ltd., Englewood, CO (US)

(72) Inventors: Roj Thomas, Whitefield (IN); Padmanabha R. Rao, Palo Alto, CA (US); Dmitry Dimov, San Francisco, CA (US); Shailesh Deshmukh, Foster City, CA (US)

(73) Assignee: Sling Media Pvt Ltd., Bangalore (IN)

( * ) Notice: Subject to any disclaimer, the term of this patent is extended or adjusted under 35 U.S.C. 154(b) by 0 days.

(21) Appl. No.: 17/069,069

(22) Filed: Oct. 13, 2020

(65) Prior Publication Data

US 2021/0112307 A1 Apr. 15, 2021

(30) Foreign Application Priority Data

Oct. 15, 2019 (IN) .............................. 201941041687

(51) Int. Cl.
*H04N 21/4627* (2011.01)
*H04L 41/12* (2022.01)
*H04L 12/28* (2006.01)
*H04L 65/65* (2022.01)
*H04L 65/1069* (2022.01)

(52) U.S. Cl.
CPC ......... *H04N 21/4627* (2013.01); *H04L 12/28* (2013.01); *H04L 41/12* (2013.01); *H04L 65/1069* (2013.01); *H04L 65/608* (2013.01)

(58) Field of Classification Search
CPC ..... H04N 21/4627; H04L 12/28; H04L 41/12; H04L 65/1069; H04L 65/608
USPC .......................................................... 709/219
See application file for complete search history.

(56) References Cited

U.S. PATENT DOCUMENTS

| | | | | |
|---|---|---|---|---|
| 7,366,779 | B1 * | 4/2008 | Crawford | ................ H04L 51/04 709/203 |
| 7,818,444 | B2 | 10/2010 | Brueck | |
| 8,789,126 | B1 * | 7/2014 | Nijim | ................ H04N 21/4126 725/133 |
| 2006/0053485 | A1 * | 3/2006 | Li | ........................ H04L 69/163 726/11 |

(Continued)

*Primary Examiner* — James E Springer
(74) *Attorney, Agent, or Firm* — Wash Park IP Ltd.; John T. Kennedy

(57) ABSTRACT

Devices, systems and processes for multi-device access, control and presentation of streaming content are described. A system may include a first content access device that includes a first storage component, a first communications component operable to receive first content, and a first hardware processor operable to access a second content access device, control the second content access device, provide a first content to the second content access device, and swap a presentation of the second content on the second presentation device with a presentation of the first content on the second presentation device. A first presentation device may present the first content. A second presentation device may present the second content. Second storage, communications, and hardware processor components are operable to execute the second set of computer instructions that are substantially similar to the first set of computer instructions may be used.

19 Claims, 6 Drawing Sheets

(56) References Cited

U.S. PATENT DOCUMENTS

| | | | | |
|---|---|---|---|---|
| 2009/0303197 A1* | 12/2009 | Bonczek | ................ | H04N 5/765 |
| | | | | 345/173 |
| 2014/0279889 A1* | 9/2014 | Luna | ....................... | G06F 16/27 |
| | | | | 707/626 |
| 2015/0295982 A1* | 10/2015 | Kafle | ...................... | H04L 69/18 |
| | | | | 709/219 |
| 2015/0334638 A1* | 11/2015 | Kim | ....................... | H04L 67/16 |
| | | | | 370/329 |
| 2015/0341570 A1* | 11/2015 | Jaynes | .................... | G06F 3/165 |
| | | | | 348/705 |
| 2015/0373065 A1* | 12/2015 | Holmquist | .......... | H04L 65/4084 |
| | | | | 715/753 |
| 2018/0249199 A1* | 8/2018 | Lau | .................... | H04N 21/2747 |

\* cited by examiner

DEVICES, SYSTEMS AND PROCESSES FOR MULTI-DEVICE ACCESS, CONTROL AND PRESENTATION OF STREAMING CONTENT

CROSS-REFERENCE TO RELATED APPLICATIONS

This application claims priority to Indian Patent Application Serial Number 201941041687, which was filed on 15 Oct. 2019, entitled "DEVICES, SYSTEMS AND PROCESSES FOR MULTI-DEVICE ACCESS, CONTROL AND PRESENTATION OF STREAMING CONTENT", and in the name of inventors Roj Thomas, Padmanabha R. Rao, Dmitry Dimov, and Shailesh Deshmukh—the entire contents of which are incorporated herein by reference.

TECHNICAL FIELD

The technology described herein generally relates to devices, systems, and processes for providing multiple device access, control and presentation of streaming content. More specifically, the technology described herein relates to providing for access, control and/or presentation of content available on a first digital media player device on a second digital media player device. Even more specifically, the technology described herein relates to providing picture-in-hand and other content access, control and presentation capabilities across multiple device platforms including mobile devices, 10-foot devices and other devices.

BACKGROUND

Today, a content access device is commonly able to access content from a wide variety of content publishers on a live, on-demand, or other basis, using streaming apps respectively executing on a single device. User of such devices, however, are not able to seamlessly switch the access, control and/or presentation of such content between two or more of such devices. Instead, each access device is typically required to execute a digital media streaming player, using computer hardware and computer executable instructions. Such digital media player creates a separate session with a content server, such as one hosted on the Internet, and such content is streamed from the content server (or a cache/proxy thereof) to that content access device. While a content access device can often stream cast the content to a wirelessly connected display device, such as a television, only one session is established between a content access device and a content server.

Further, while other content access devices may establish a separate session with a content server and while such second session may arise within a same location and/or on a same local network, a first content access device is not able to seamlessly switch access, control and/or presentation of content arising with a first content access device to a second content access device.

Likewise, such two or more devices are commonly not communicatively coupled to each other and thus multi-device interactivity is not possible.

Instead, today users are commonly required to access content using each unique content access device and a unique digital media player application instantiation executing thereon. For example, a user currently watching a first show on a mobile device may desire to switch the watching of such first show to a 10-ft device. Using currently available technologies, such user is typically required to uniquely access the first show content by selecting the content using a second content access device, start a new streaming session on the second content access device, and if DVR functions are available, resume presentation of the first show using the second content access device and a second session with a content server. Such approach is inefficient of network resources (e.g., two streaming sessions are initiated), incurs undesired delays in content presentation, prevents user mobility (for example, the user cannot seamlessly resume presentation of the content on the mobile device—for example during a user transition from a living room, where the presentation device is located, to a second area, such as a kitchen), and encounters other well-known technical problems.

Accordingly, the various embodiments of the present disclosure are directed to resolving these and other technical problems by providing interoperability and seamless transitions of control and presentation of content between two or more access devices.

SUMMARY

The various embodiments of the present disclosure provide computer implemented technologies which enable multiple access devices to access, control, manage, swap, present and other use features and functions of a first streaming app, executing on a first content access device, by and with a second streaming app, executing on a second content access device. More specifically, the technology described herein relates to providing content available on a 10-ft device for presentation on a mobile device, and vice versa. Even more specifically, the technology described herein relates to providing picture-in-hand and other content access, control and presentation capabilities across multiple device platforms including mobile, 10-foot devices, and otherwise.

In accordance with at least one embodiment of the present disclosure, a system may include a first content access device. The first content access device may include a first storage component configured to store a first set of non-transient computer instructions, a first communications component configured to receive first content and a first hardware processor configured to execute the first set of non-transient computer instructions. The system may include a first presentation device, communicatively coupled to the first content access device, configured to present the first content and a second content access device communicatively coupled to the first content access device. The second content access device may include a second storage component configured to store a second set of non-transient computer instructions, a second communications component configured to receive second content, and a second hardware processor configured to execute the second set of non-transient computer instructions. A second presentation device may be communicatively coupled to the second content access device and configured to present the second content.

For at least one embodiment, the first set of non-transient computer instructions may include computer instructions for: accessing the second content access device; controlling the second content access device; providing of the first content, by the first content access device, to the second content access device; and for a first configuration, swapping a presentation of the second content on the second presentation device with a presentation of the first content on the second presentation device.

For at least one embodiment, the second set of computer instructions may provide computer instructions substantially similar to the first set of computer instructions. The second set of computer instructions may be adapted for use with the second content access device.

For at least one embodiment, the first content access device may be a mobile device; and the second content access device may be a 10-Ft device. For at least one embodiment, the first content may be received over a first streaming session with a first content server and the second content may be received over a second streaming session with a second content server.

For at least one embodiment, the system may include a local area network (LAN). The first content access device may be communicatively coupled to the second content access device over the LAN. The system may include a wide area network. Each of the first streaming session and the second streaming network may the LAN and the wide area network to respectively communicate the first content from the first content server to the first content access device and the second content from the second content server to the second content access device.

For at least one embodiment, the first set of non-transient computer instructions include computer instructions for non-transiently instantiating a multi-screen sender. For at least one embodiment, the first content access device may be communicatively coupled to a local area network (LAN) and the multi-screen sender may be configured to initiate discovery of one or additional content access devices communicatively coupled to the LAN. The discovery may include use of at least one of the DIAL and Bonjour protocols. For at least one embodiment and prior to an initiation of discovery, the first content access device is not communicatively coupled over the LAN to the second content access device.

For at least one embodiment, the second set of non-transient computer instructions may include computer instructions for non-transiently instantiating a second multi-screen receiver. The second multi-screen receiver may be configured to receive a discovery request and, in response to the discovery request, identify to the first content access device that the second content access device is present on the LAN. The communicative coupling of the second content access device with the first content access device may occurs using a pairing protocol executed between the first content access device and the second content access device.

For at least one embodiment, the first set of non-transient computer instructions may include computer instructions for instantiating at least one of a remote app controller, a remote media controller, a remote key controller, and a remote screen controller.

For at least one embodiment, the second set of non-transient computer instructions may include computer instructions for providing an embedded server. The embedded server may be configured to instantiate at least one of a request listener, a request parser, and a remote screen handler.

For at least one embodiment, each of the first content and the second content are presented in a picture-in-hand format on the first and second presentation devices.

For at least one embodiment and for a second configuration, a first set of non-transient computer instructions may include computer instructions for providing a second content, by a second content access device, to a first content access device and presenting the second content on the first presentation device.

For at least one embodiment and for a third configuration, a first set of non-transient computer instructions may include computer instructions for presenting each of a first content on a second presentation device and a second content on a first presentation device.

In accordance with at least one embodiment of the present disclosure, a content access device may include a first presentation device configured to present first content, a first storage component configured to store a first set of non-transient computer instructions, and a first hardware processor configured to execute the non-transient computer instructions. For at least one embodiment, the non-transient comprising instructions may include instructions for accessing a second content access device. The second content access device may be communicatively coupled to a second presentation device. The non-transient comprising instructions may further include instructions for controlling the second content access device, providing the first content to the second content access device, and swapping a providing of second content with the first content, for presentation on the second presentation device.

For at least one embodiment, the first content may be received from a first server. The first content access device may be communicatively coupled to the second content access device over a local area network (LAN). A discovery and launching protocol may be utilized by the first content access device to establish a multi-screen link between the first content access device and the second content access device.

For at least one embodiment, the content access device may be one of a mobile device and a 10-Ft device.

In accordance with at least one embodiment of the present disclosure, a process, for providing multiple device access, control and/or presentation of streaming content, may include discovering by a first content access device a second content access device. The discovering may occur over a local area network (LAN) communicatively coupled to each of the first content access device and the second content access device. The process may also include establishing at multi-screen link between the first content access device and the second content access device over the LAN by pairing the first content access device with the second content access device. The process may also include, in response to a request from the first content access device, enabling by the second content access device and with respect to the first content access device at least one of access to the second content device, control of the second content device, a swapping of presentation of second content with first content on a second presentation device communicatively coupled to the second content access device, and a reversing the swapping of presentation of the second content with the first content. The first content may be received over a first streaming session between the first content access device and a first content server. The second content may be received over a second streaming session between the second content access device and a second content server. The first streaming session and the second streaming session may persist throughout a multi-screen session.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108*a*-

108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1:
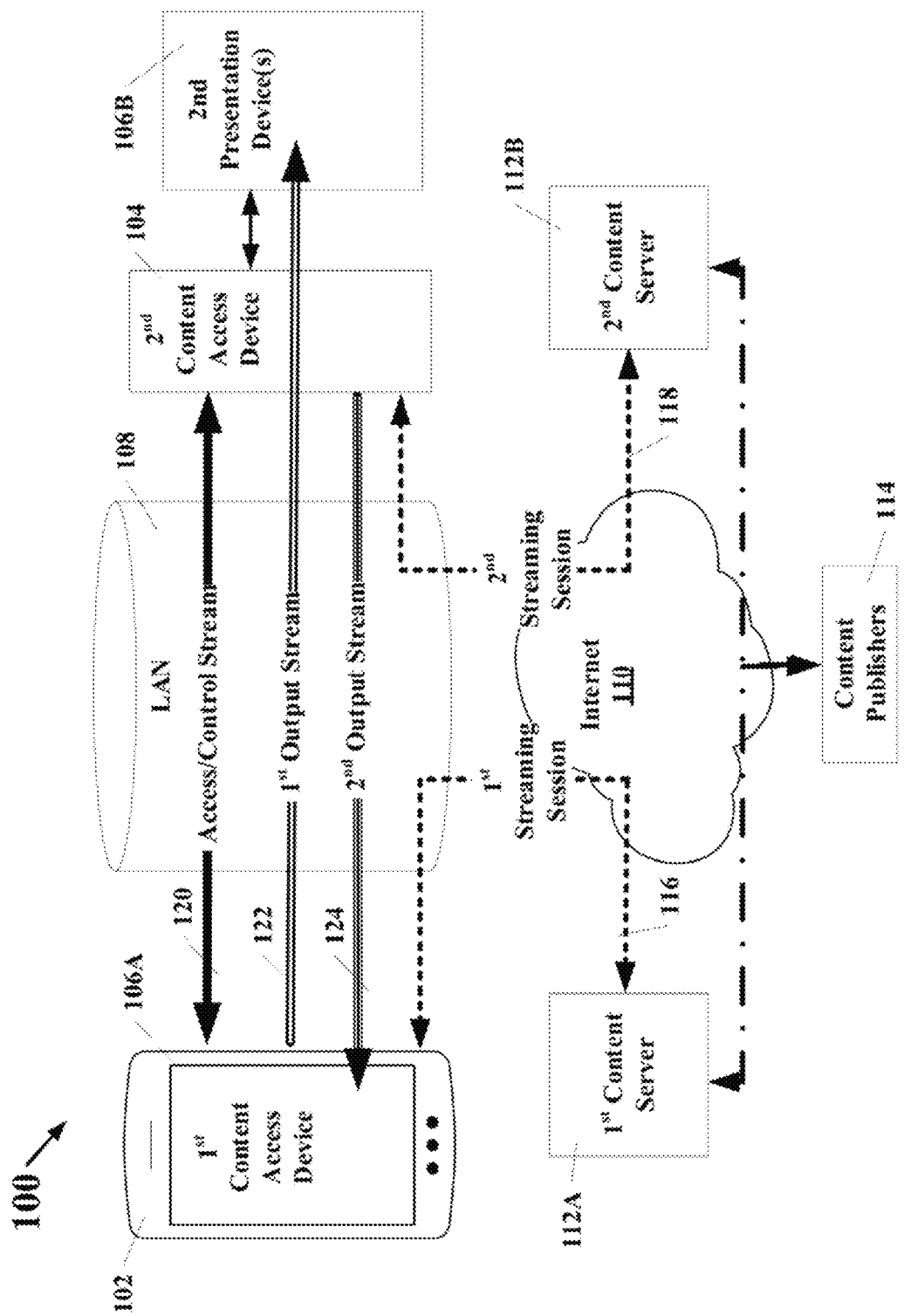
FIG. 1 is a schematic representation of a system for providing multiple content access device access to streaming content and in accordance with at least one embodiment of the present disclosure.

The various embodiments described herein are directed to devices, systems, and processes for providing multiple content access devices with access, control and presentation of streaming content. More specifically, the various embodiments described herein relates to providing control, by a first content access device such as a mobile device, of content available on a second content access device, such as a digital media player device. Likewise, the various embodiments described herein relate to the providing of content accessible, by streaming or otherwise, by the first content access device on a presentation device coupled to the second content access device. Similarly, reverse access, control and/or presentation operations by the second content access device with respect to the first content access device are provided by one or more embodiments of the present disclosure. Further, the various embodiments described herein relate to providing picture-in-hand and other content access, control and presentation capabilities across multiple content access device platforms including mobile, 10-foot devices, mobile devices and otherwise.

For at least one embodiment of the present disclosure, the multi-screen providing of content (as defined below) access, control, presentation, and other capabilities between three or more content access devices.

The various embodiments are intended for use with a first content access device (as defined below) and a second content access device. For at least one embodiment, such content access devices are enable and discoverable (to each other and other device) on a Local Area Network or similar network of two or more substantially co-located devices. As used herein, devices are co-located when they are within wireless communications range of each other using known or later arising communications technologies, such as WIFI™ and the like.

For at least one embodiment, a first content access device may be used to facilitate access to content by a second content access device. More specifically and for at least one embodiment, credentials for a content access device that has already established a session with a first content server may be utilized to seamlessly establish a session between a second content access device and a second content server (which may be the same as or different than the first content server). When the first content access device and the second content access device are respectively known to each other over a LAN or similar network, access credentials established with the first content access device may be used by the second content access device to facilitate establishing of a session by the second content access device with a content server. It is to be appreciated that for at least one embodiment, credentials associated with the first content access device may be provided to the second content access devices in a clear or secure format and using any known or later arising data cryptology, security and other technologies.

For at least one embodiment, credentials associated with the first content access device may be directly provided by the first content access device to the second content server with which the second content access devices seeks to establish a session. Such communications may include information needed to establish the session between the second content access device and a first or second content server. Further, credentials provided by the first content access device may be used. Other forms of data exchanges may be used to facilitate the connecting of a second content access device with a content server based upon credentials and/or other information arising from an existing or previously existing session between a first content access device and a first content server. For at least one embodiment, each of the first content access device and the second content access device are known and/or discoverable to each other over a LAN or are similarly co-located network. The first content access device and second content access device may be directly communicatively coupled to each other over the LAN. As used herein, directly communicatively coupled means without using an external network, such as a wide area network, the Internet, or otherwise communicating signals beyond one or more firewalls provided by an Ethernet router, modem, or the like.

The various embodiments of the present disclosure may also be configured to facilitate multiple content access device control. More specifically and in accordance with at least one embodiment, a first content access device, such as a mobile device, may be configured to provide control features for a second content access device, such as a 10-Ft device (as defined below). More specifically, a user may utilize the first content access device to provide input/output and other control capabilities that are often more cumbersome to utilize, if provided at all, using a second content access device. For example, a mobile device when configured as the first content access device may provide a touch screen or similar interface by which a user may input alphanumeric characters (for example, using a display on-screen keyboard or using text recognition of one's handwriting). In contrast, that same user using an input/output device provided by a second content access device, such as a 10-Ft device, may not be able to use on-screen keyboards or the like and is instead uses cursor control functions to selectively input alphanumeric inputs. The latter being more time consuming and cumbersome. In accordance with at least one embodiment, multi-content access device control is provided by which the user can input characters using the mobile device which are seamlessly communicated to the 10-Ft device and utilized to change one or more settings or inputs, as presented via the 10-Ft device, such as a program selection, channel selection, input chat stream comments, or otherwise.

For at least one embodiment, user control of content access devices may occur using any known or later arising user input technologies. Non-limiting examples of user input technologies include voice, touch, eye tracking, gesture and other user input technologies. Input technologies provided on a first content access device may be used to control inputs desired for a content access device using one or more of the embodiments of the present disclosure.

Similarly and for at least one embodiment of the present disclosure, a first access device may be configured to facilitate access by a second access device to a given content. For example, the first content access device, such as a mobile device, may be configured for presenting of a first content stream (such as a first football game) while the second content access device, such as a 10-Ft. device, may be configured for presenting of a second content stream (such as a second football game). In accordance with at least one embodiment of the present disclosure, a user desiring to switch between presentation of the first content stream and the second content stream may seamlessly do so with a simple "swap" command or a similar command. When executed, the "swap" command replaces the presentation of the second content stream on the 10-Ft. device with a presentation of the first content stream. The first content access device may be configured to then present either the second content stream or the first content stream. The replacing, or "swapping," of such content may occur without requiring execution of new streaming sessions by either of the content access devices. More specifically, the sessions arising between the first content access device and a first content server and the second content access device (the "first streaming session") and a second content server (the "second streaming session") remain live and active and are not interrupted before, during or after a swap. Instead, the content access devices reroute an output stream of the content received in the respective first content stream and second content stream over the LAN for reception by the other content access device(s) and presentation using a display device coupled to each content access device. It is to be appreciated that a reverse swap may also occur at any desired time and that swaps may occur with any desired frequency, based upon any desired event (such as the scoring of a touchdown in a given football game), or otherwise.

In accordance with at least one embodiment, first content in a first content stream and second content in a second content stream are provided using respective first and second streaming sessions. The first and second streaming sessions are established between first and second content access devices with respective first and second content server(s). The content servers provide the first and second content as streaming content. It is to be appreciated that the content server(s) may be the same or different servers. For at least one embodiment, respective streaming sessions are not interrupted during swaps or other operations arising from use of an embodiment of the present disclosure.

While one of access, control and/or presentation operations supported by an embodiment of the present disclosure are occurring, for at least one embodiment, the first content access device continues to receive, from a given content server, the first content stream providing content for the first football game, while the second content access device continues to receive either the second content stream providing content for the second football game, or a new content stream, as instructed by use of either the first content access device (operating in a multi-screen control mode) or as instructed by a remote or other input device coupled to the second content access device. In short, one or more active streaming sessions remain intact and active during multi-screen access, control and/or presentation modes of the various embodiments of the present disclosure.

In accordance with at least one embodiment, a communication of swapped content between content access devices may occur over a Local Area Network. A first content access device may exchange content details with a second content access device using a protocol defined by a multiscreen software development kit (SDK). A non-limiting example of a protocol is further described below and for at least one embodiment of the present disclosure.

For at least one embodiment, a presentation of content in a picture-in-hand ("PIH") format may also be supported. Similar to the swap functionality described above, when PIH is selected, a first content access device communicates its first output stream to a second content access device and the output stream from the second content access device may be communicated to the first content access device, such that the content streams are affectively swapped. The presentation of content in a PIH format on a given presentation device may use any known or later arising PIH formatting layouts, technologies, and the like.

As shown in FIG. 1 for at least one embodiment of the present disclosure, various forms of audio, video, audio-video, graphical and other content (herein, individually and collectively, "content") may be accessed, controlled and/or presented using multiple content access devices.

As shown, the system may include a first content access device 102 and a second content access device 104. A first content access device 102 and a second content access device 104 may be either (and in some cases both) of a mobile device and a 10-Ft. device (as each are described below). For example, one implementation of the present disclosure may include as a first content access device 102 a 10-Ft device and as a second content access device 104, a second 10-Ft device. For another implementation, each of the first and second content access devices may be mobile devices. For another implementation, one of the content access devices may be a mobile device while another of the content access device(s) may be a 10-Ft. device, or vice versa. As used herein, 10-Ft devices and mobile devices are collectively and interchangeably referred to herein as each being a "content access device." For purposes of clarity herein only and in the remainder of this description only, the first content access device 102 is identified as being a mobile device and the second content access device 104 is identified as being a 10-Ft. device.

As used herein, a mobile device is generally any device configured for reception of a content stream and outputting of an output stream for presentation on a presentation device coupled thereto. Non-limiting examples of mobile devices include, but are not limited to, personal computers, laptop computers, tablet devices, smartphones, and other devices (herein, each a "mobile device" 108).

As used herein, a 10-Ft. device is generally any device configured for receiving streaming content and processing such content for presentation on a presentation device that is more than a few feet away from a user. The content and/or user interfaces presented are presented for use with a "10-foot UI" as commonly defined. For purposes of explanation only and not by limitation, one definition for a "10-foot UI" (as provided by PC Magazine) is, "[a] user interface for a TV set. The '10 foot' is used to differentiate it from a desktop computer screen that is typically less than two feet from the viewer's eyes. Designed to be operated by a handheld remote control, the 10-foot user interface (UI) has extra-large buttons and menu text that are easily navigated." Non-limiting examples of a 10-Ft. device include any of a plurality of digital media player devices including, but not limited to, ROKU®, AMAZON FIRE TV®, Chromecast®, LG TV®, SAMSUNG SMART TV®, and other devices.

The first content access device 102 and the second content access device 104 are communicatively coupled to respective presentation devices 106A/B. The presentation devices 106A/B may any suitable device for presenting given content. The presentation devices 106A/B may be provided with and/or remote to a content access device.

Each content access device 102/104 is configured to execute computer executable instructions which instantiate a mobile application (a "streaming app") on each such content access device. Each streaming app facilitates communications by and between the content access device and one or more content servers. The streaming app commonly facilitates a receiving of content from a content server in a "content stream", processing such content, and outputting, such content in an "output stream." The output stream may be provided in any form suitable for communication of content from a content access device to a presentation device coupled thereto. The output stream may be encrypted, encoded, packetized or otherwise provided in a digital format for communication using a wired and/or wireless communication link between a content access device and a presentation device.

The first content access device 102 and the second content access device 104 are each communicatively coupled to a Local Area Network (LAN) 108.

Content is received from one or more content servers 112A/B using any known and/or later arising content streaming technologies. Content streaming service providers and their associated servers, databases and the like are referred to herein as "content servers." Content servers 112A/B communicate, over a network, such as the Internet 110, with content access devices. Content is provided in a first streaming session 116 and a second streaming session 118 to respective first and second content access devices 102/104.

In accordance with at least one embodiment, a content access device may be configured to establish an access/control stream 120 with another content access device. For at least one embodiment, the access/control stream 120 is a bi-directional communication link established over the LAN 108.

As shown in FIG. 1 and for at least one embodiment, an output stream may be a uni-directional stream providing content available by a first content access device 102 to a second content access device 104, and vice versa. In FIG. 1, a first output stream 112A/B is shown as providing content from the first content access device 102 to the second content access device 104 for presentation on one or more second presentation devices 106B. Further shown is a second output stream 124 providing content from the second content access device 104 for presentation on a first presentation device 106A provided with and/or communicatively coupled to the first content access device 102. It is to be appreciated that the content provided by a content server 112A/B may be provided on a real-time and/or delayed basis (e.g., playback of previously recorded content).

The access/control stream 120 and first and second output streams 122/124, (individually and collectively herein, each a "multi-screen link") may use any desired wired and/or wireless communications links. When wireless communications links are utilized, any desired communications frequencies including, but not limited to, 2.4 GHz, 5 GHz, 5.9 GHz and 60 GHz bands. For at least one embodiment, one or more WIFI™ protocols may be used. Non-limiting examples of WIFI protocols include IEEE 802.3, IEEE 802.11a-n, and others. Further, any desired form of communications security may be used with a multi-screen link including, but not limited to, WEP, WPA, WPA2, and others. Virtual private networking and/or other networking technologies may be used with a multi-screen link. It is to be appreciated that other communications technologies may be used for at least one embodiment of the present disclosure to facilitate the multi-screen link, non-limiting examples including Bluetooth, WiMAX, Cellular connections and otherwise. For at least one embodiment, a multi-screen link may be established over a LAN. A multi-screen link facilitates the providing of streaming content being accessed by a first content access device 102 or a second content access device 104 to be seamlessly accessed, controlled and presented by another content access device.

For at least one embodiment, a multi-screen link may be established, in whole or in part, between content access devices using any communications link that facilitates discovery of a content access device by another content access device. For at least one embodiment, to facilitate establishment of and use of one or more multi-screen links, each of the first content access device 102 and the second content access device 104 are configured such that each content access device is discoverable on a given LAN. When "asleep", each content access device may be "awoken" (as necessary) by another content access device on the LAN. A content access device may be configured to be discoverable during any desired period, such as on-demand, between certain hours, according to a programming schedule, or other basis.

For at least one embodiment, a multi-screen link may be established using the Discovery and Launch ("DIAL") protocol developed by NETFLIX, Inc. and the YouTube service provided by Google LLC. It is to be appreciated that other forms of discovery and launching protocols may be used, non-limiting examples including: AIRPLAY™ provided by Apple, Inc., DLNA® provided by the Digital Living Network Alliance, the Service Location Protocol (SLP), Jini, Miracast, the Simple Service Discovery Protocol (SSDP), and others.

At least one embodiment of the present disclosure may use DIAL to identify, by a first content access device 102, a second content access device 104 on a given LAN or similar subnetwork and establish one or more multi-screen links such that one or more of content access, control and presentation may occur by and between the first content access device 102 and the second content access device 104.

The content is often provided by a producer and/or distributor thereof, herein a "content publisher" 114. Non-limiting examples of content publishers 114 include movie and TV studios such as DISNEY® and 20$^{th}$ CENTURY FOX®, television and cable channels such as NBC®, CBS®, and DISCOVERY CHANNEL®, and content aggregators such as YOUTUBE® and others. One or more content streaming service providers may be used to provide content to a content access device.

The content may be received by a content access device directly or indirectly from a content publisher 114 and/or a content server 112A/B. The LAN 108 and a wide area network, such as the Internet 110 may be used. As shown in FIG. 1, one or more communications links may be used to directly or indirectly couple a content access device with one or more content servers 112A/B.

For at least one embodiment, the streaming app enables content to be requested by a content access device and received from a content streaming service provider, as instantiated on one or more content servers 112A/B. Non-limiting examples of content streaming service providers include SLING TV®, NETFLIX®, HBO GO® and others. The accessing of content by a content access device by way of a content streaming provider is well known in the art and is not further described herein. The various embodiments of the present disclosure may utilize any known or later arising technologies to facilitate the requesting, access, control, streaming, presentation and otherwise by a content access device of content provided by one or more content publishers, and using (as desired) one or more content streaming providers/content servers.

Figure 2:
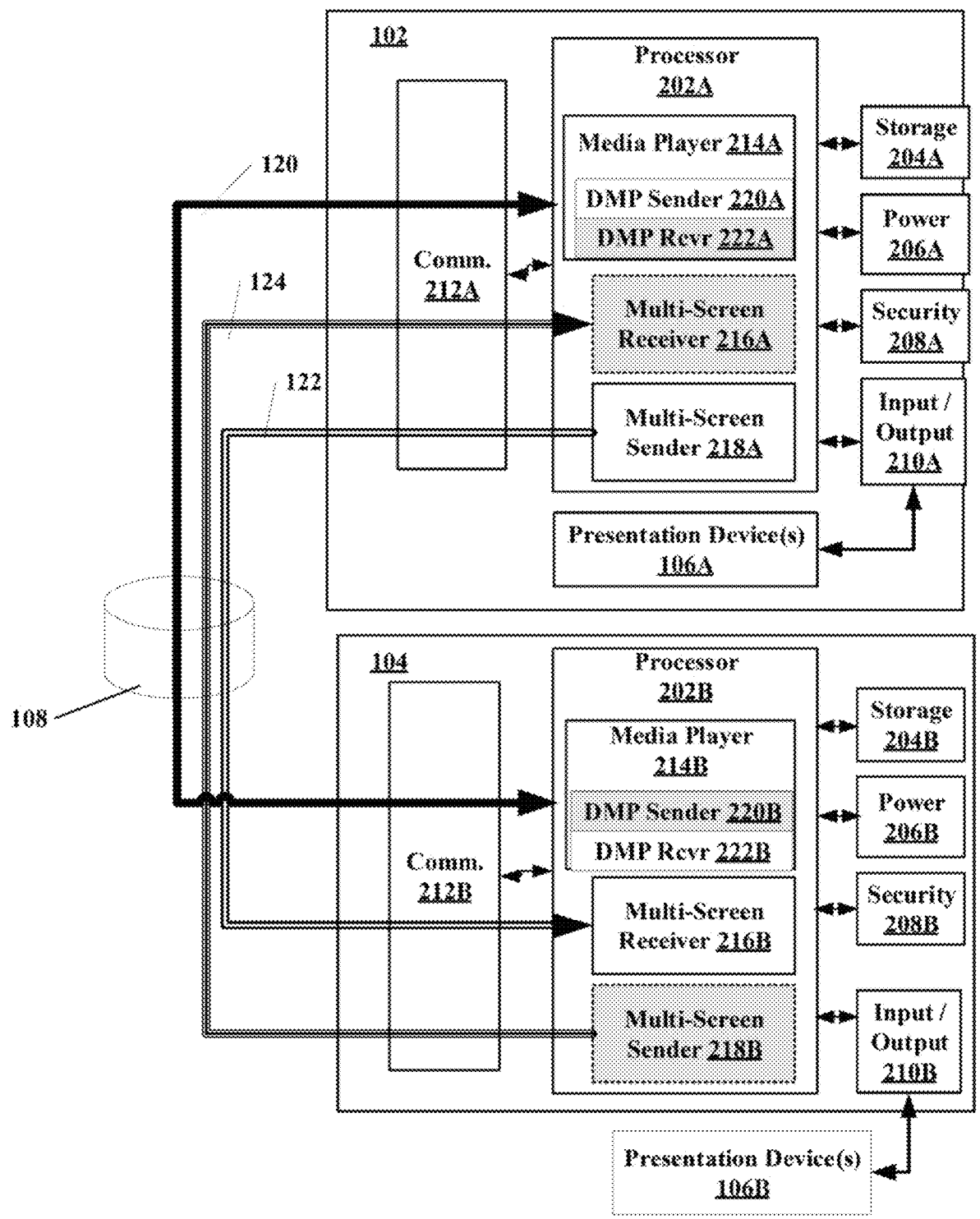
FIG. 2 is a schematic representation of hardware/software instantiated components utilized to provide multiple content access device interoperability, streaming and other capabilities in accordance with at least one embodiment of the present disclosure.

As shown in FIG. 2 and for at least one embodiment of the present disclosure, a first content access device 102 includes one or more commonly available device components, such as a first processor 202A, a first storage component 204A, a first power component 206A, a first security component 208A, a first input/output component 210A, and a first communications component 212A. A first presentation device 106A may be provided with or communicatively coupled to the first content access device 102. The first presentation device 106A may include one or more of a display and/or other component capable of presenting information to a user in a humanly perceptible format, such as audibly, visually or otherwise.

A second content access device 104 may include a second processor 202B, a second storage component 204B, a second power component 206B, a second security component 208B, a second input/output component 210B, and a second communications component 212B. A second presentation device 106B may be provided with or communicatively coupled to the second content access device 104. The second presentation device 106B may include one or more of a display and/or other component capable of presenting information to a user in a humanly perceptible format, such as audibly, visually or otherwise.

More specifically and for at least one embodiment, each processor 202 may include any hardware and software processor elements used in a general purpose or special purpose computing device. The hardware is configured to execute non-transient computer executable instructions configured to provide one or more of the features and/or functions described herein. For at least one embodiment, the processor 202 may include one or more hardware processors, such as 32-bit and 64-bit central processing units, multi-core ARM based processors, microprocessors, microcontrollers, and otherwise (hereafter, "processor(s)"). The non-transient computer executable instructions may include instructions for executing one or more applications, software engines, and/or processes configured to perform computer executable operations (hereafter, "computer instructions"). Such hardware and computer instructions may arise in any desired computing configuration including, but not limited to, local, remote, distributed, blade, virtual, or other configurations and/or systems configured for use in support of the one or more embodiments of the present disclosure.

The storage components 204 may include one or more transient and/or non-transient data storage components (not shown). Such data storage components include hardware and non-transient computer instructions configured to facilitate storage of data. Such data storage, for any given element of data, may occur for any desired time period, including indefinitely. Any known or later arising data storage hardware and computer instructions may be used with one or more embodiments of the present disclosure to provide the storage component. The storage component 204 may be provided in whole or in part within a given content access device and/or remotely to a given content access device.

The power components 206 may include any known or later arising technologies which facilitate the use of electrical energy by a content access device. Non-limiting examples of such technologies include batteries, power converters, inductive charging components, line-power components, solar power components, and otherwise.

The security components 208 may include any known or later arising security hardware components and/or computer instructions configured for use to secure content, communications regarding such content, access device processes and data, and otherwise. Security components may be used to facilitate secure transmission, processing, storage and otherwise of any data used in accordance with an embodiment of the present disclosure.

The input/output components 210 may include any known or later arising human to device interface components, processes and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The input/output components 210 may be coupled to and/or include the one or more presentation devices 106.

The communications components 212 may be configured to use any known or later arising communications and/or networking technologies which facilitate the use of a content access device in accordance with an embodiment of the present disclosure.

As further shown in FIG. 2, each processor 202 is configured to execute non-transient computer instructions for providing one or more computer objects including a multi-screen receiver 216 and a multi-screen sender 218. At any given time during use of a multi-screen link, the first content access device 102 may be configured as a first multi-screen sender 218A while the second content access device 104 may be configured as a second multi-screen receiver 216B and vice versa.

For at least one embodiment and for a given period, the first content access device 102 instantiates a first multi-screen sender 218A for communicating content over a multi-screen link with a second multi-screen receiver 216/B. For at least one embodiment, multiple second multi-screen receivers 216B maybe instantiated for the given period of use of a multi-screen link. When two or more second multi-screen receivers 216B are instantiated for the given period of use of a multi-screen link, the multi-screen links operate in a "multi-cast multi-stream mode." When only one second access device 104 instantiates a second multi-screen receiver 216B for a given period of use of the multi-screen link, the multi-screen link herein operates in a "uni-cast multi-stream mode." Each of the multi-cast and uni-cast multi-stream modes are further described herein as arising during a "multi-stream session." One or more functional components of a multi-screen sender 218 and multi-screen receiver 216 are shown in FIGS. 3-6 and are further described below.

For at least one embodiment, respective roles and functions of a multi-screen sender 218 and a multi-screen receiver 216 may transfer between content access devices. Such transfers of roles/functions may arise with respect to a unique multi-screen sessions, during a given multi-screen session, or otherwise. As used herein, a multi-screen session includes any period time arising from initiation of a DIAL or other discovery protocol to termination of any multi-screen link established between two or more content access devices. It is to be appreciated that a multi-screen link may be permanent, temporary, or otherwise established for any desired period of time.

More specifically, and as shown in FIG. 2, a first configuration of a multi-screen link may include use of a first multi-screen sender 218A, provided by a first content access device 102, the access/control stream 120, a second multi-screen receiver 216B, provided by the second content access device 104, and the first output stream 122. Contrarily, a second configuration of a multi-screen link may include use of a second multi-screen sender 218B provided by the second content access device 104, the access/control stream 120, a first multi-screen receiver 216A provided by the first content access device 102 and the second output stream 124. For a third configuration, each of the multi-screen receivers 216A/B, multi-screen senders 218A/B, access/control stream 120, first output stream 122, and second output stream 124 may be active during a multi-screen session. As shown in FIG. 2, for each of the first configuration, the second configuration and the third configuration, the first digital media player 214A and the second digital media player 214B are utilized to facilitate communications over the access/control stream 120.

For at least one embodiment of the present disclosure, each content access device may be configured to include digital media player related features and functions. Any such currently available and/or later arising digital media player features and functions thereof may be provided. It is to be appreciated that for at least one embodiment, dedicated digital media player components may not be used and instead hardware processors in the content access devices execute computer instructions that facilitate the providing of the digital media player component.

For at least one embodiment, an access device may be further configured to include, within and/or in conjunction with a digital media player 214, a sender 220 and a receiver component 222. For at least one embodiment, the sender 220 may include a callback component. For at least one embodiment, the receiver component 222 may include a remote parser component. During use of a multi-screen link, a given content access device executes one or more of the sender 220 and the receiver component 222.

For at least one embodiment, each content access device may be configured to seamlessly switch between the first configuration, the second configuration, and the third configuration on a substantially real-time basis. As used herein "seamlessly" means that an action occurs with minimal user input. For example, a "swap" may occur while a multi-screen link is active by a user swiping across a touch screen on a first content access device 102 to move a window presenting a first output stream off the display. The user swipe operation instructs the first content access device 102 to swap the content to the second content access device 104.

Figure 3:
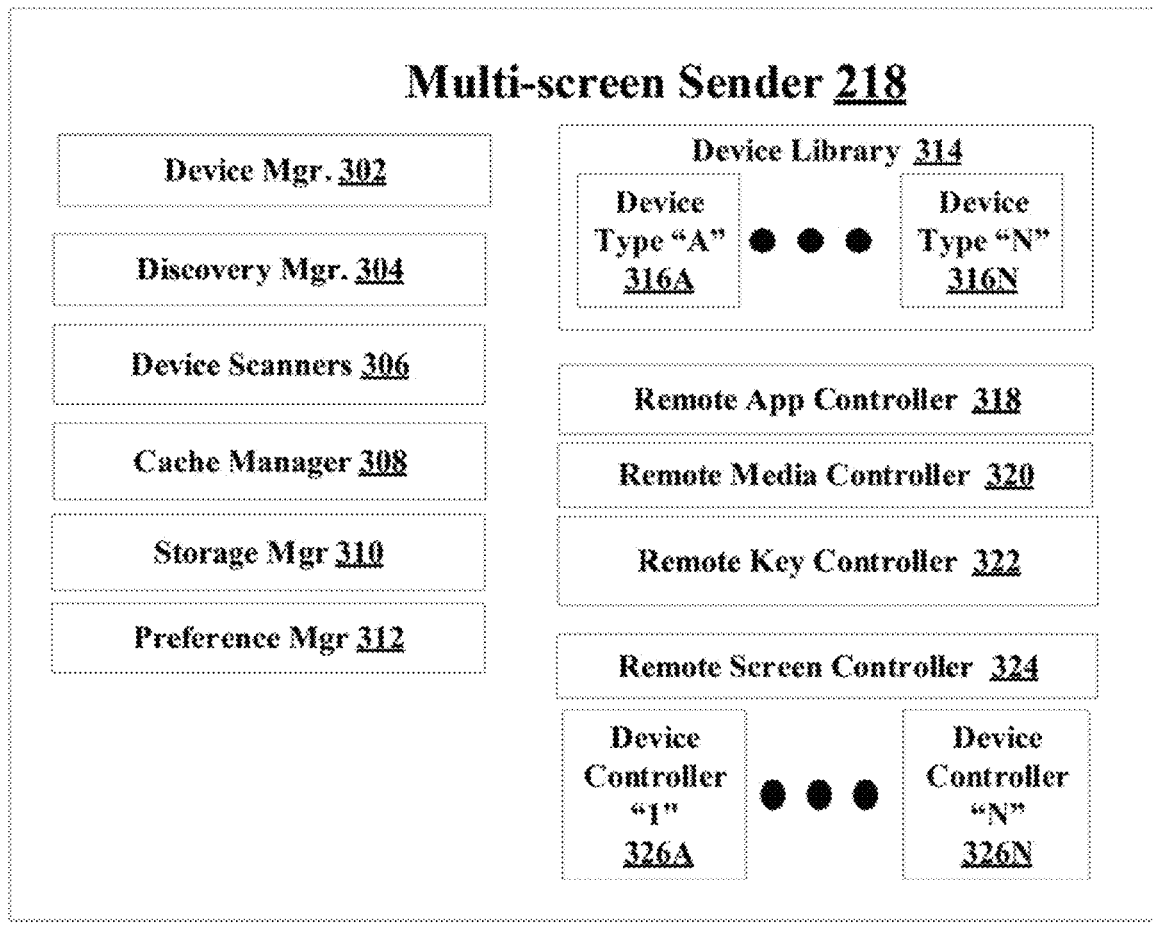
FIG. 3 is a schematic representation of hardware/software instantiated components in a content access device that are utilized to provide multi-screen sender functions and capabilities in accordance with at least one embodiment of the present disclosure.

In FIG. 3, high level architectural elements of a multi-screen sender 218 are depicted. For at least one embodiment, the multi-screen sender 218 may include computer processors and computer instructions configured to facilitate various application program interface (API) components and other logical components. One such API is a device manager 302. The device manager 302, with the assistance of a discovery manager 304 and a cache manager 308 (each are further described below) determines if a second content access device 104 has been previously connected with the first content access device 102 on a given LAN and, if so, automatically pairs the content access devices, while also informing the user(s) of the existence of the other content access device on the LAN and the pairing thereof. It is to be appreciated that the user(s) may be informed using any human perceptible signal, such as audible, visible, or other signals. For at least one embodiment, a plurality of multi-screen senders 218 may be paired with a given multi-screen receiver 216.

For at least one embodiment, the multi-screen sender 218 may also be configured to execute a discovery manager 304. The discovery manager 304 may be configured to populate a library identifying other content access devices on a given LAN. The discovery manager 304 may be configured to execute one or more device scanners 306, such as DIAL, Bonjour, and otherwise (as discussed above). The device scanners 306 initiate one or more discovery messages on the LAN that seek to identify content access devices on the LAN. The search may be for any content access device, those of a given type, or otherwise. For example, a search may be initiated for only 10-Ft devices manufactured by ROKU.

In response to such discovery query, those responding (if any) second content access device(s) may respond with port, address, and other configuration information. Such configuration information may be used by the multi-screen sender 218 to populate a device library 314. The configuration information may also be used by each digital media player 214 to establish, use and maintain the access/control stream 120 during a multi-screen session. The search may result in multiple connectable devices being identified. Characteristics of each such identified device may be populated in the device library 314. Devices discovered may each have a unique device types 316A-N. The device library 314 may be updated as content access devices are added/removed from the LAN, or on any otherwise desired basis. The discovery API may be configured to include a parameter that interfaces with the sender 220 of a given digital media player 214 to identify discovered devices on the LAN.

Figure 4:
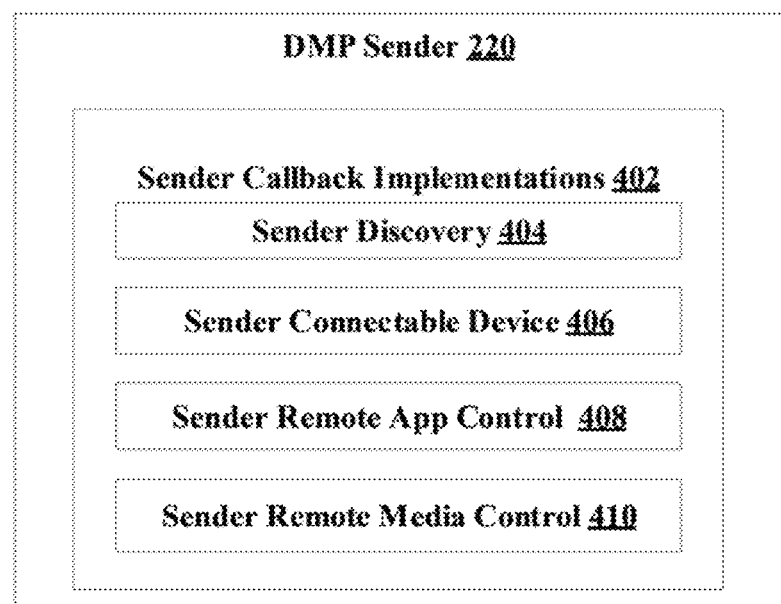
FIG. 4 is a schematic representation of hardware/software instantiated components in a content access device that are utilized to provide a sender callback implementation components in accordance with at least one embodiment of the present disclosure.

As shown in FIG. 4, a sender 220 of a digital media player 214 may include one or more components including a sender discovery 404 and a sender connectable device 406. For at least one embodiment, the discovery manager 304 and sender 220 may be configured to identify discovered devices on the LAN and present the same for selection by the user.

For at least one embodiment, the multi-screen sender 218 may be configured to automatically select and connect with a discovered second content access device 104.

As further shown in FIG. 3, the multi-screen sender 218 may be configured to include a cache manager 308. The cache manager 308 identifies last paired connected content access device(s) on the LAN. It is to be appreciated that pairings may occur across any given LAN between multiple pairings of first and second content access devices. For example, a location may include a second content access device 104, such as one provided in a home entertainment room, and a first content access device 102 that might include, from time to time, a first mobile device (such as one used by a first user) and at other times with a second mobile device (such as one used by a second user). The cache manager 308 may be configured to identify past pairings of a given first content access device 102 with the second content access device 104 to facilitate future pairings of content access devices under previously used, previously specified, and/or other conditions.

The multi-screen sender 218 may be configured to include a storage manager 310. The storage manager 310 may be configured to store data related to content access devices including, but not limited to, data regarding previously connected content access devices.

The multi-screen sender 218 may be configured to include a preference manager 312. The preference manager 312 may include one or more user preferences. For example, a user may prefer to utilize a multi-screen session between specific content access devices, at specific times of day, for specific types of content, and otherwise.

Upon selection of a second content access device 104, the multi-screen sender 218 may also be configured to include and execute an "initialize API." The initialize API identifies to the sender 220 those one or more second content access device(s) 104 from which the first content access device 102 is to expect to receive communications. Such communications may take the form of "callbacks"—as such term is ordinarily used in the art.

The multi-screen sender 218 may also be configured to include and execute at least one "control API." A control API enables a first content access device 102 to control one or more features and functions of a second content access device 104. Examples of control APIs include a remote app controller 318, a remote media controller 320, a remote key controller 322, and a remote screen controller 324. Each content access device may utilize one or more unique control codes and the like. These are shown in FIG. 3 by device controllers 1 to N 326A-N. Control codes may be common or unique, may arise across two or more content access devices, may arise with respect to any control function including, but not limited to, remote app control, remote media control, remote key control, and remote screen control, and otherwise.

As shown in FIG. 4, a sender 220 of a digital media player 214 may include other functions including a sender remote app control 408 and sender remote media control 410. For at least one embodiment, the sender remote app control 408 and sender remote media control 410 are callback functions. Other functions, including but not limited to other callback functions, may be used, as desired for a given embodiment, to facilitate a multi-screen session.

For at least one embodiment, a multi-screen sender 218 may be configured to execute a remote app controller 318 configured to provide streaming app functionality provided by a second content access device 104 to the pair first content access device 102 (during a first configuration) or vice versa (during a second configuration). For example, a second content access device 104 might be a ROKU device. When paired therewith, a first content access device 102 (such as a mobile phone) may be provided with one or more of the control functions provided by the ROKU device. Such control functions may be provided in conjunction with a given streaming app, such as a streaming app configured for use with SLING TV.

Such controls functions may include the providing of content data regarding content being accessed by the second content access device 104. Non-limiting examples of such content data may include program title, remote player slate, program duration, current location in a program, whether seeking, pause, skip forward, skip backward or other controls are permissible, channel on which a program is being provided, recording status for the program, source of the program, such as stream, over-the-air, satellite, cable, digital video recorder (DVR), and other information.

For at least one embodiment, a multi-screen sender 218 may be configured to execute a remote media controller 320 configured to define remote streaming functionalities of the second content access device 104. Non-limiting examples of such remote streaming functionalities include bit rate, resolution, and other data.

For at least one embodiment, a multi-screen sender 218 may be configured to execute a remote key controller 322 configured to provide remote controller functions provided by a controller dedicated for use by a second content access device 104, such as a ROKU specific remote control device, for use by the input/output components of the first content access device 102. For at least one embodiment, mappings of remote controller button functions may occur manually, semi-automatically, or automatically.

For at least one embodiment, a multi-screen sender 218 may be configured to execute a remote screen controller 324 configured to implement each of the remote app controller 318, remote media controller 320 and remote key controller 322 functions.

Figure 5:
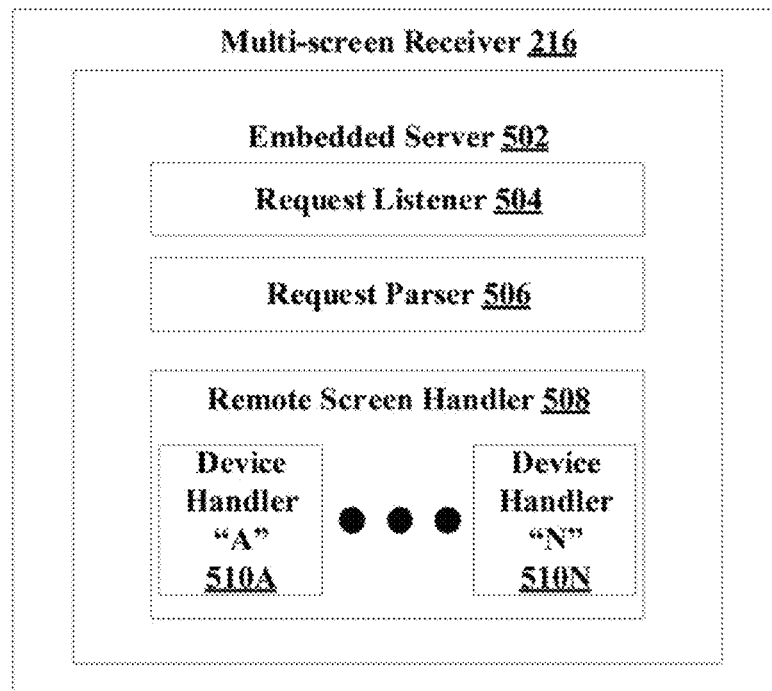
FIG. 5 is a schematic representation of hardware/software instantiated components in a content access device that are utilized to provide multi-screen receiver functions and capabilities in accordance with at least one embodiment of the present disclosure.
Figure 6:
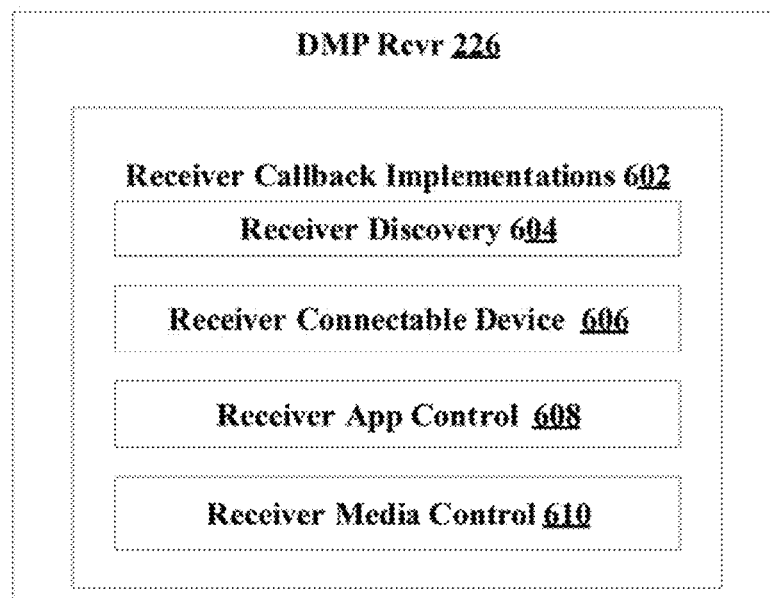
FIG. 6 is a schematic representation of hardware/software instantiated components in a content access device that are utilized to provide a receiver callback implementation components in accordance with at least one embodiment of the present disclosure

In FIG. 5, high level architectural elements of a multi-screen receiver 216 are depicted. Herein, the multi-screen receiver 216 is described in conjunction with the first configuration and as being executed by the second content access device 104, such as 10-Ft device. For at least one embodiment, the multi-screen receiver 216 may include computer instructions configured to execute various API components. One such API is an embedded server 502. For at least one embodiment, the embedded server 502 may be configured to operate as an HTTP server. The embedded server 502 may be further configured to receive one or more commands or instructions from a multi-screen sender 218 executing on another content access device.

The embedded server 502 may be further configured to execute one or more other components including a request listener 504, a request parser 506 and a remote screen handler 508. These components include computer executed instructions that are executed by the processor 202 of the second content access device 104.

The request listener 504 may be configured to extend a third party JAVA server, or other suitable web server, to listen for HTTP requests made to the multi-screen receiver 216 by another content access device. For at least one embodiment, the request listener 504 may be configured to extend a nanoHTTPD server. The request parser 506 may be configured to parse or otherwise handle HTTP requests received by the multi-screen receiver 216 from one or more multi-screen senders 218. For at least one embodiment, the request parser 506 may perform one or more data processing actions, such as parsing get and post requests and calling any appropriate APIs for a given remote screen handler 510. For at least one embodiment, the request parser 506 may forward requests to the remote screen handler 508. Responses from a remote screen handler 508 may also be parsed and/or otherwise handled by the request parser 506 and forwarded to the multi-screen sender 218 executing on another content access device.

The remote screen handler 508 may be configured to handle requests received from the multi-screen sender 218 executing on another content access device. Non-limiting examples of one or more requests handled by the remote screen handler 508 include: play requests, where a request to present a given program is received; pause streaming requests; stop streaming requests; skip content requests; remote control command requests; streaming status; other status requests; login status requests; program info requests; and other requests.

The remote screen handler 508 may be further configured to operate in conjunction with one more device specific device handlers 510A-N. A device handler may be configured for each type of digital media player and/or streaming app provided by given content access device. For example, a ROKU screen handler may be provided for use with ROKU digital content streaming devices. Likewise, a FIRE TV screen handler may be provided for use with FIRE TV content streaming devices. Other types of screen handlers may be provided for use with other forms of content streaming devices.

For at least one embodiment, one or more of the multi-screen sender 218 and the multi-screen receiver 216 may be further configured to execute one or more "at rest" APIs, herein "rest APIs". The rest APIs provider various information regarding operating conditions of a given content access device and other system 100 components. One non-limiting example of information provided by a rest API may include a get server request, which requests the status of a given content server 112A/B. Another non-limiting example is a get login request, which requests the login status for a given user from a content server 112A/B. Another non-limiting example is a "to play" message, which provides information to a content server 112A/B regarding a source or origin of content to be presented. Another non-limiting example is a get streaming status request, which provides information regarding a current streaming of content session such as a state of the digital media player being used to present the content, a program title, a program duration, a current location within the program, whether seek, pause, skip forward, skip backward and other modes of content accessing are permissible, and other information. Another non-limiting example is a current program info request, which retrieves information regarding the content currently being streamed, such as title, channel, whether recorded, whether over-the-air, and other information. Another non-limiting example is a content presentation command, such as stop, pause, skip forward and skip backward, which instruct a content server 112 to take a particular action with respect to content currently being provided by the content server 112. Other non-limiting examples include a remote command, a cease streaming of a given content command, a logout from a streaming app command, and other commands.

Figure 7A:
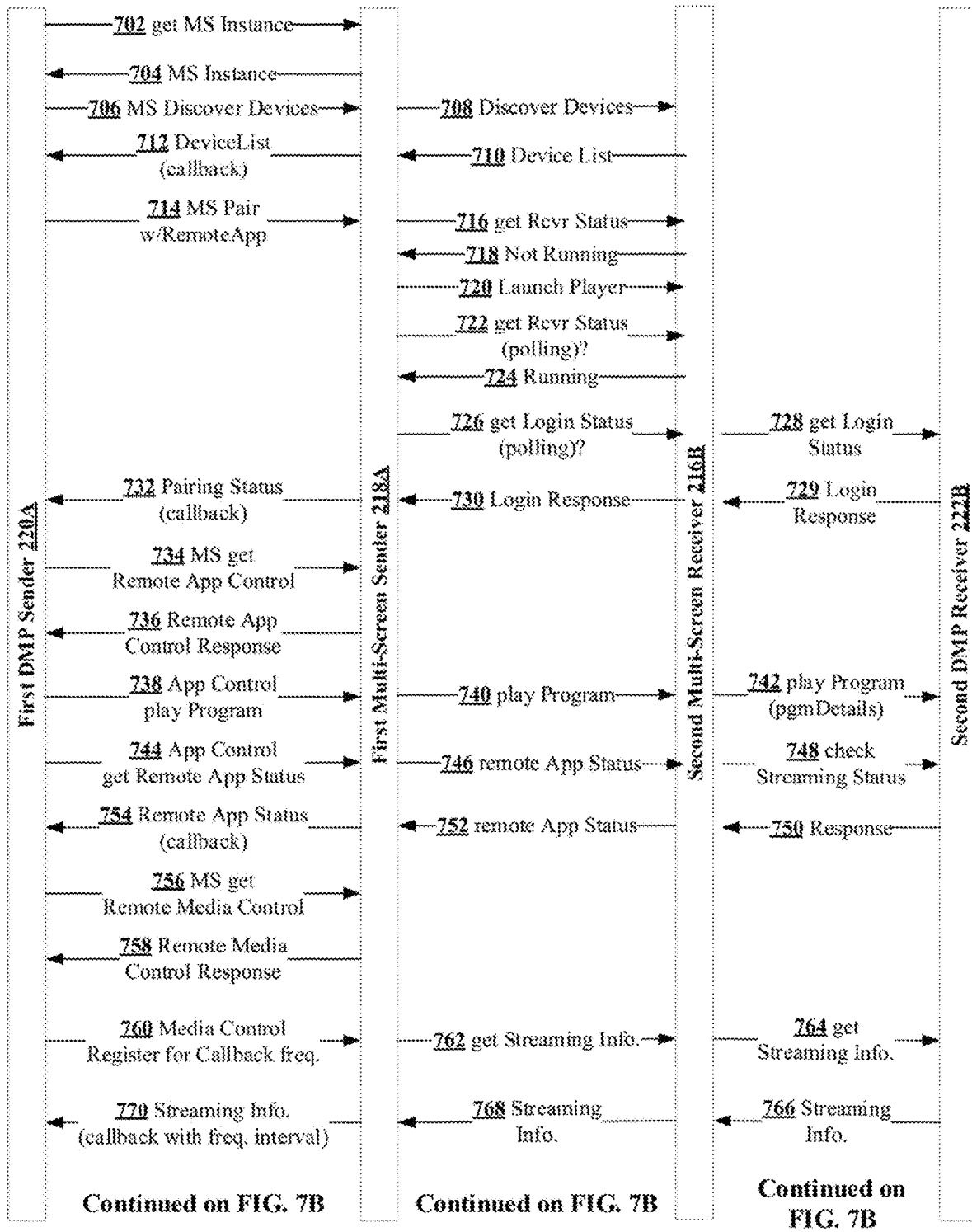
FIGS. 7A-7B is a flow chart illustrating communications between one or more of a sender component, a multi-screen sender, a multi-screen receiver, and a receiver component provided in two content access devices and in accordance with at least one embodiment of the present disclosure.
Figure 7B:
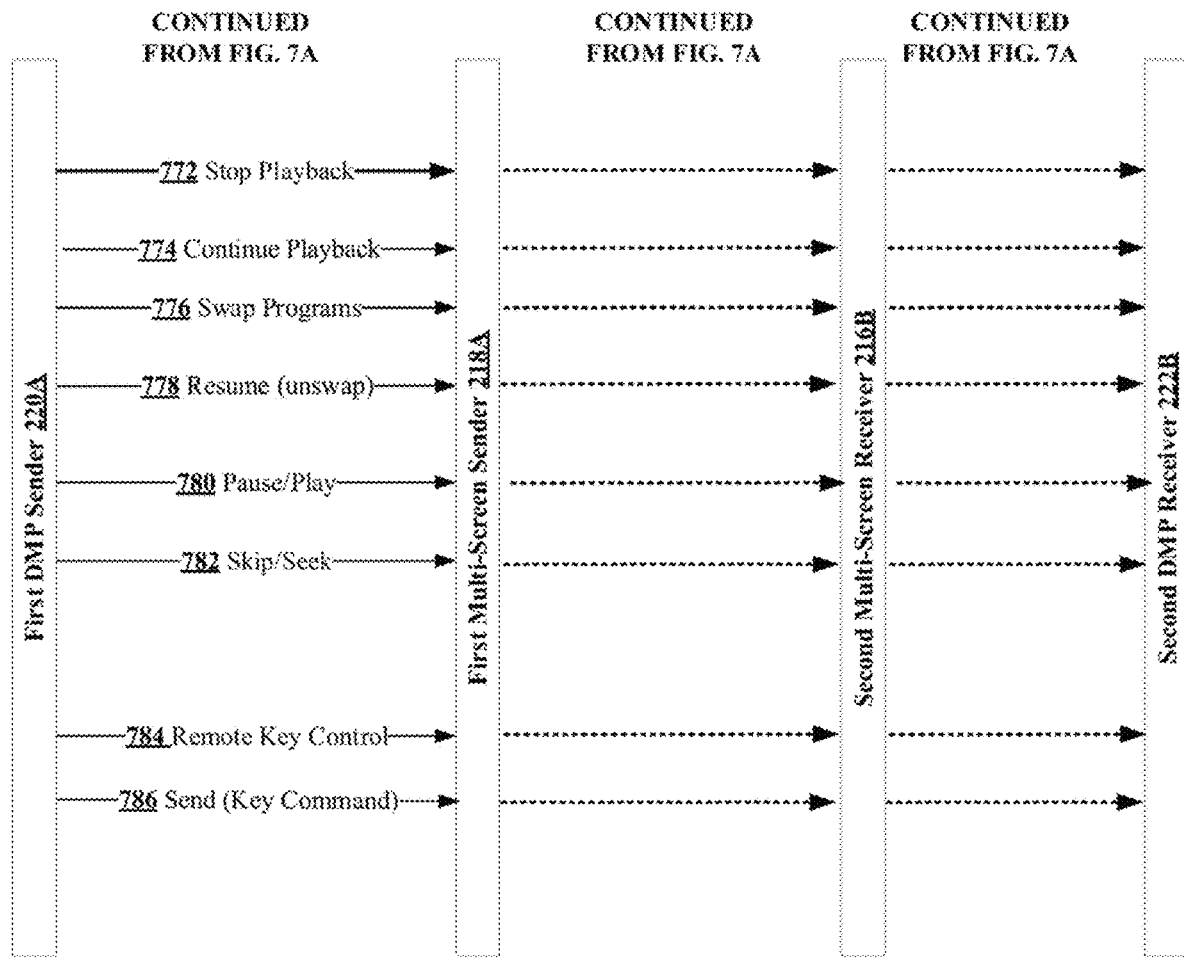

In FIGS. 7A/7B, one embodiment of a process by which multi-screen functions of the present disclosure may be accomplished is shown. As shown, commands and responses proceed between the digital media player 214, multi-screen receiver 216 and multi-screen sender 218 executing on two or more content access devices. Again, for purposes of discussion only reference is made to components of the first content access device 102, as designated by "first" and "A", and components of the second content access device 104, as further designated by "second" and "B." It is to be appreciated that such first/second and A/B designations are arbitrary and any given content access device may be so designated depending upon whether a first configuration, second configuration or third configuration is used.

Discovery Operations: Per Operations 702 to 712 one or more discovery operations may occur. More specifically and for at least one embodiment of the present disclosure, per Operation 702 discovery operations may include sending a request, by a first sender 220 of a first digital media player 214A of a first content access device 102 to initiate a first multi-screen sender 218A. It is to be appreciated that Operation 702 and other operations described herein, may not be needed for embodiments where a first multi-screen sender 218A is already active on a given content access device.

Per Operation 704, the first multi-screen sender 218A is initiated and once functionally active, the first multi-screen sender 218A responds with status information.

Per Operation 706, the first DMP sender 220A requests a listing of second content access devices 104 available on the LAN 108.

Per Operation 708, the first multi-screen sender 218A initiates a discovery process, such as DIAL.

Per Operation 710, one or more second multi-screen receivers 216B connected to the LAN 108 and executing on (or as then awakened) on one or more second content access devices 104 responds with relevant device information. It is to be appreciated that the one or more second multi-screen receivers 216B may be substantially powered down when inactive, while still configured to receive and respond to discovery requests and other communications on the LAN. For at least one embodiment, the second digital media player 214B may listen and respond to discovery requests.

Per Operation 712, the first multi-screen sender 218A may be configured to provide information regarding those one or more second content access devices 104 discovered and available on the LAN and with respect to which a multi-screen link may be established. One or more of the available second content access devices 104 is selected manually, semi-automatically, or automatically using the first content access device 102.

Pairing Operations: Operations 714 to 732 provide for one or more pairing operations that may occur using an embodiment of the present disclosure. Such pairing operations configure each of the first content access device 102 and the second content access device(s) 104 for multiple device access, control and presentation of streaming content using a multi-screen link. For at least one embodiment, pair include establishing of an access/control stream 120 of a multi-screen link between the first content access device 102 and the second content access device(s) 104.

More specifically, per Operation 714, a pairing process occurs whereby, for the first configuration, the first multi-screen sender 218A is paired with a second multi-screen receiver 216B. For the second configuration, it is to be appreciated that the components used may be reversed respectively on the first content access device 102 and the second content access device 104. For the third configuration, each of the first and second multi-screen sender(s) 28 and each of the first and the multi-screen receiver(216) may be suitably paired.

Per Operation 716, a status inquiry is communicated from the first multi-screen sender 218A to the second multi-screen receiver 216B. Per Operations 718 and 720, various operations may occur including launching one or more components, if not then active, on the second content access device 104 needed to facilitate multi-screen access, control and presentation of content. It is to be appreciated that activation of such components on a second content access device 104 is device specific and may vary from device to device.

Per Operation 722, a polling of the status of the second content access device 104 may occur. Such polling may occur periodically, based upon status conditions, based upon desired future conditions, or otherwise.

Per Operation 724, a response to the polling of Operation 722 is provided by the second DMP receiver 222B, of the second digital media player 214B, of the second content access device 104. The response may include information communicating an indicator that the second digital media player 214B is configured for a multi-screen session.

Per Operation 726, a polling of the login status of a user for the second content access device 104 may be communicated by the first multi-screen sender 218A to the second multi-screen receiver 216B.

Per Operation 728, the second multi-screen receiver 216B forwards the login status request to the second DMP receiver 222B.

Per Operations 729 and 730, each of the respective second DMP receiver 222B and the second multi-screen receiver 216B provide a response, as shown, indicating the status of the user is logged-in. It is to be appreciated that one or more of the second multi-screen receiver 216B and/or the second digital media player 214B may take appropriate actions to log-in the desired user. If user login is not possible, the operations cease and/or terminate until any needed login actions are successfully accomplished.

Per Operation 732, once the second content access device 104 is appropriately configured for a multi-screen session, a pairing status callback message is communicated from the first multi-screen sender 218A to the first DMP sender 220A. It is to be appreciated that each of the first digital media player 214A and second digital media player 214B, an instance of each the first multi-screen sender 218A and the second multi-screen receiver 216B, are operable for multiple device access, control and presentation of streaming content when a user is logged in to a content server. However, for other embodiments, such as embodiments where publicly available content is provided, user log-in may not be required.

Remote Control Operations: Operations 734 to 758 provide for one or more remote control operations that may occur using an embodiment of the present disclosure.

Per Operation 734, the process may include requesting remote application control by the first DMP sender 220A from the first multi-screen sender 218A.

In response and per Operation 736, remote application control may be granted in full or in part. It is to be appreciated that one or more user settings, preferences, or the like may be used in determining whether a given user of the first content access device 102 can utilize one or more, if any, remote control features for use in conjunction with the second content access device 104. For example, user specific settings, such as allowed programs, viewing times, or the like might be configured for the second content access device 104 and may not be circumventable using the first content access device 102 in accordance with an embodiment of the present disclosure.

Per Operation 738, when one or more remote application control features are allowed, the first content access device 102 may communicate a command such as a "play program" command over the established access/control stream 120 to the second content access device 104. Such command may be first communicated by the first digital media player 214A to the first multi-screen sender 218A.

Per Operation 740, the "play program" command may be further communicated, over the multi-screen link, to the second multi-screen receiver 216B.

Per Operation 742, the second multi-screen receiver 216B provides the "play program" command to the second DMP receiver 222B, which suitably instructs a content server 112A/B to present the requested program using the second digital media player 214B and on a second presentation device 104B coupled thereto.

Per Operation 744, the first DMP sender 220A may initiate a remote app status query of the first multi-screen sender 218A. For at least one embodiment, such a query may be used to determine a status of a remote application executing on the second content access device 104.

Per Operation 746, the first multi-screen sender 218A may forward the remote app status query, across the access/control stream 120, to the second multi-screen receiver 216B.

Per Operation 748, the second multi-screen receiver 216B forwards the remote app status query to the second DMP receiver 222B. The second DMP receiver 222B performs any requested status checks, interfacing with the content server(s) 112, as needed, and per Operation 750 provides a response to the second multi-screen receiver 216B. For at least one embodiment, such response may be a simply Yes/No, indicating that the remote app is executing. For other embodiments, the response may provide any information responsive to the query.

Per Operation 752, the second multi-screen receiver 216B forwards the response to the first multi-screen sender 218A using the access/control stream 120. In forwarding the response, the second multi-screen receiver 216B may provide some, all and/or additional or different information than it received from the second DMP receiver 222B.

Per Operation 754, the first multi-screen sender 218A forwards information provided in the response(s) to the first DMP sender 220A. It is to be appreciated, however, that various forms of queries and response may arise without use of a multi-screen sender and/or a multi-screen receiver and may additionally and/or alternatively occur between respective first and second DMP components.

Per Operation 756, the first DMP sender 220A may send a remote media control message to the first multi-screen sender 218A. For at least one embodiment, such a message may be used to enable the first content access device 102 to change content being access by the second content access device 104.

Per Operation 758, a response by the multi-screen sender 218 is provided. The response may indicate whether remote media control is or is not permitted for a given multi-screen session.

Operations 760-770: These operations provide an example of information that may be accessible by a first content access device 102 regarding the operation of a second content access device 104. For at least one embodiment, such information may be accessible by communicating various messages to those components possessing the relevant information. Here, an exemplary message may be used to enable the first content access device 102 to be notified of content being access by the second content access device 104 and when the selected content changes. It is to be appreciated that such capability may be useful for parental control of content provided to second content access devices 104, such as those associated with children.

Per Operation 760, the first DMP sender 220A may send a remote media control register for callback message to the first multi-screen sender 218A.

Per Operation 762, the first multi-screen sender 218A communicates a "get streaming info" message, or the like, to the second multi-screen receiver 216B.

Per Operation 764, the second multi-screen receiver 216B forwards the "get streaming info" message to the second DMP receiver 222B.

Per Operation 766, the second DMP receiver 222B responds to the second multi-screen receiver 216B with the streaming info, which per Operation 768, is further communicated to the first multi-screen sender 218A, and per Operation 770, is further communicated to the first DMP sender 220A, which presents the streaming information for the second content access device 104 to the first user via the first presentation device 106A communicatively coupled to the first content access device 102. It is to be appreciated that for at least one embodiment, the streaming info may be requested once and provided whenever content changes. For other embodiments, one or more components may be configured to periodically poll the second DMP receiver 222B for such content information. Such polling may occur on any desired frequency and for any desired period.

Operations 772-782: These operations provide non-limiting examples of various media control operations by which control of content by a first content access device 102 may occur with respect to a second content access device 104. For purposes of simplicity only, forwarding and return acknowledgement messages are not shown.

Per Operation 772, a first DMP sender 220A may communicate a stop playback request, via the first multi-screen sender 218A and the second multi-screen receiver 216B, to the second DMP receiver 222B. Upon receiving the request, the second DMP receiver 222B takes an appropriate action.

Per Operation 774, a first DMP sender 220A may communicate a continue playback request, via the first multi-screen sender 218A and the second multi-screen receiver 216B, to the second DMP receiver 222B. Upon receiving the request, the second DMP receiver 222B takes an appropriate action.

Per Operation 776, a first DMP sender 220A may communicate a swap program request, via the first multi-screen sender 218A and the second multi-screen receiver 216B, to the second DMP receiver 222B. For this request, the second DMP receiver 222B may be configured, depending upon whether PIH is or is not desired, to receive first content from the first content access device 102 using the first output stream 122 and present such content on the second presentation device 106B. When PIH is desired, the first content received from the first content access device 102 may be presented in conjunction with the second content received by the second content access device 104 in any desired window or other configuration on the second presentation device(s) 106B.

Per Operation 778, a first DMP sender 220A may communicate a resume/unswap request, via the first multi-screen sender 218A and the second multi-screen receiver 216B, to the second DMP receiver 222B. Upon receiving the request, the second DMP receiver 222B takes appropriate action to restore presentation of the second content on the second presentation device(s) 106B.

Per Operation 780, a first DMP sender 220A may communicate a pause/play request, via the first multi-screen sender 218A and the second multi-screen receiver 216B, to the second DMP receiver 222B. Upon receiving the request, the second DMP receiver 222B takes an appropriate action.

Per Operation 782, a first DMP sender 220A may communicate a skip/seek request, via the first multi-screen sender 218A and the second multi-screen receiver 216B, to the second DMP receiver 222B. Upon receiving the request, the second DMP receiver 222B takes an appropriate action.

It is to be appreciated that any of the above described operations may occur in any desired order and with respect to any desired content being received by either of the first content access device 102 and the second content access device 104.

Operations 784-786: These operations are directed to remote control operations, whereby a user of the first content access device 102 can virtually and/or physically use the first input/output components 210A to provide remote control inputs otherwise to be provided by a second remote control associated virtually and/or physically with the second content access device 104. It is to be appreciated that to provide such remote control signals to a second content access device 104, an IR blaster or similar device may be utilized, as needed. For purposes of simplicity only, forwarding and return acknowledgement messages are not shown.

Per Operation 784, the first DMP sender 220A may communicate a remote control request, via the first multi-screen sender 218A and the second multi-screen receiver 216B, to the second DMP receiver 222B. Upon receiving the request, the second DMP receiver 222B may permit the first user to use the first content access device 102 and/or remotes provided therewith, to provide remote control signals to the second content access device 104.

Per Operation 786, the first DMP sender 220A may communicate a remote control key command, via the first multi-screen sender 218A and the second multi-screen receiver 216B, to the second DMP receiver 222B. Upon receiving the request, the second DMP receiver 222B takes appropriate actions.

Accordingly, it is to be appreciated that the various embodiments of the present disclosure provide devices, systems and processes that facilitate multi-screen access, control and presentation across multiple content access devices while continuing to maintain active streaming sessions between two or more content access devices and one or more content servers.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A system comprising:
   a first content access device, comprising:
     a first storage component operable to store a first set of non-transient computer instructions;
     a first communications component operable to receive first content; and
     a first hardware processor operable to execute the first set of non-transient computer instructions;
   a first presentation device, communicatively coupled to the first content access device, operable to present the first content as a first content presentation;
   a second content access device, communicatively coupled to the first content access device, comprising:
     a second storage component operable to store a second set of non-transient computer instructions;
     a second communications component operable to receive second content; and
     a second hardware processor operable to execute the second set of non-transient computer instructions;
   a second presentation device, communicatively coupled to the second content access device, operable to present the second content as a second content presentation;
   wherein the first set of non-transient computer instructions comprising computer instructions for:
     directly communicatively coupling the first content access device with the second content access device over a multi-screen link;
     wherein the multi-screen link comprises:
       a bi-directional communication link including an access control stream;
       a first uni-directional output stream; and
       a second uni-directional output stream;
     directly accessing, using the access control stream of the multi-screen link, the second content access device;
     directly controlling, using the access control stream of the multi-screen link, the second content access device;
     directly providing, using the first uni-directional output stream of the bi-directional communication link, the first content, by the first content access device, to the second content access device; and
     for a first configuration, swapping a presentation, on the second presentation device, of the second content presentation with the first content presentation.

2. The system of claim 1,
   wherein the second set of computer instructions provide computer instructions substantially similar to the first set of computer instructions; and
   wherein the second set of computer instructions are adapted for use with the second content access device.

3. The system of claim 1,
   wherein the first content access device further comprises a mobile device; and
   wherein the second content access device further comprises a 10-Ft device.

4. The system of claim 1,
   wherein the first content is received over a first streaming session with a first content server; and
   wherein the second content is received over a second streaming session with a second content server.

5. The system of claim 4, further comprising:
   a local area network (LAN);
     wherein the first content access device is communicatively coupled to the second content access device over the LAN; and
   a wide area network; and
   wherein the first streaming session and the second streaming session uses the LAN and the wide area network to respectively communicate the first content from the first content server to the first content access device and the second content from the second content server to the second content access device.

6. The system of claim 2,
   wherein the first set of non-transient computer instructions further comprise computer instructions for non-transiently instantiating a multi-screen sender.

7. The system of claim 6,
   wherein the first content access device is communicatively coupled to a local area network (LAN); and
   wherein the multi-screen sender is operable to initiate discovery of additional content access devices communicatively coupled to the LAN.

8. The system of claim 7,
   wherein discovery includes using at least one of a DIAL protocol and a Bonjour protocol.

9. The system of claim 7,
   wherein prior to initiation of discovery, the first content access device is not communicatively coupled over the LAN to the second content access device.

10. The system of claim 7,
    wherein the second set of non-transient computer instructions further comprise computer instructions for non-transiently instantiating a second multi-screen receiver;
    wherein, the second multi-screen receiver receives a discovery request and
      in response to the discovery request identifies, to the first content access device, that the second content access device is present on the LAN; and
    wherein a communicative coupling of the second content access device with the first content access device occurs using a pairing protocol executed between the first content access device and the second content access device.

11. The system of claim 1,
    wherein the first set of non-transient computer instructions further comprise computer instructions for instantiating at least one of a remote app controller, a remote media controller, a remote key controller, and a remote screen controller.

12. The system of claim 1,
    wherein the second set of non-transient computer instructions further comprise computer instructions for providing an embedded server.

13. The system of claim 12;
    wherein the embedded server instantiates at least one of a request listener, a request parser, and a remote screen handler.

14. The system of claim 1,
wherein the first content and the second content are presented in a picture-in-hand format on the second presentation device.

15. The system of claim 2,
wherein, for a second configuration, the first set of non-transient computer instructions comprise computer instructions for:
 providing the second content, by the second content access device, to the first content access device; and
 presenting the second content on the first presentation device.

16. The system of claim 15,
wherein, for a third configuration, the first set of non-transient computer instructions comprise computer instructions for:
 presenting the first content on the second presentation device and the second content on the first presentation device.

17. A content access device comprising:
 a first presentation device operable to present a first content;
 a first storage component operable to store a first set of non-transient computer instructions; and
 a first hardware processor operable to execute the first set of non-transient computer instructions;
 wherein the first set of non-transient comprising instructions comprise instructions for:
  directly communicatively coupling the first content access device with a second content access device over a multi-screen link;
  wherein the multi-screen link comprises:
   a bi-directional communication link including an access control stream;
   a first uni-directional output stream; and
   a second uni-directional output stream;
  directly accessing, using the access control stream of the multi-screen link, the second content access device;
  wherein the second content access device is communicatively coupled to a second presentation device;
  directly controlling, using the access control stream of the multi-screen link, the second content access device;
  directly providing, using the first uni-directional output stream of the bi-directional communication link, the first content, by the first content access device, to the second content access device; and
  swapping a providing of second content with the first content, for presentation on the second presentation device.

18. The content access device of claim 17,
wherein the first content is received from a first server;
wherein a first content access device is communicatively coupled to the second content access device over a local area network (LAN); and
wherein a discovery and launching protocol is utilized by the first content access device to establish the multi-screen link between the first content access device and the second content access device.

19. The content access device of claim 17, further comprising:
 one of a mobile device and a 10-Ft device.

* * * * *